June 22, 1937. O. R. SWEENEY 2,084,980
MATBOARD HANDLING MACHINE
Filed Dec. 31, 1934 9 Sheets-Sheet 1
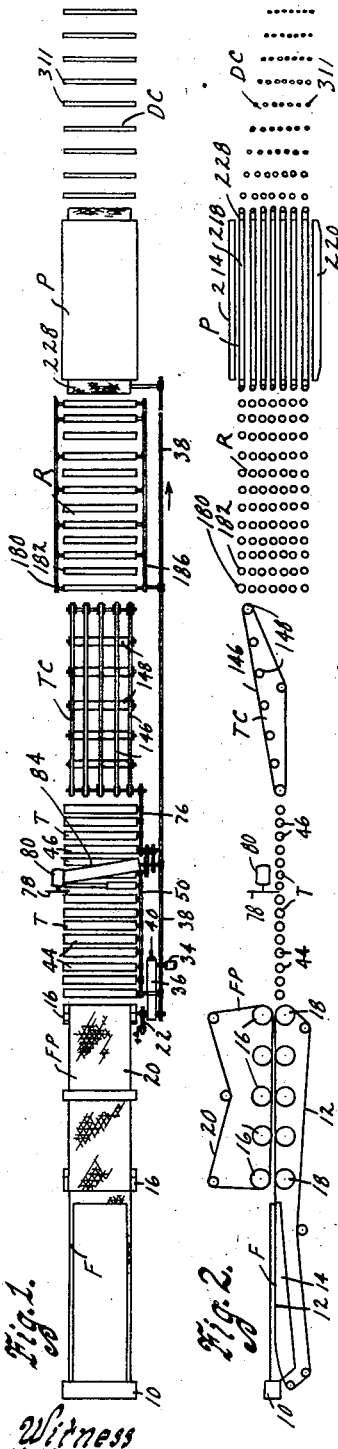
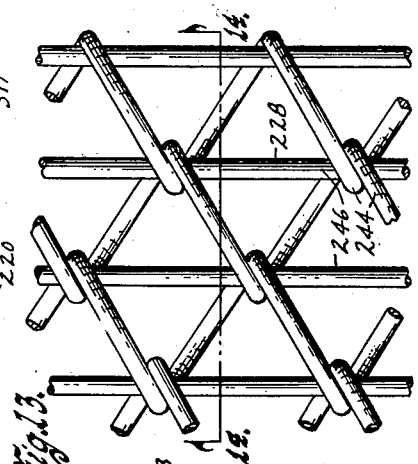
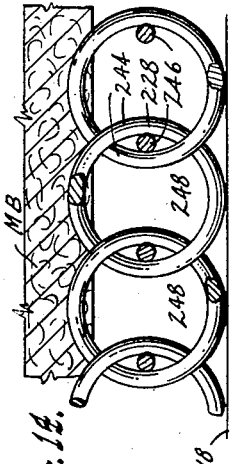
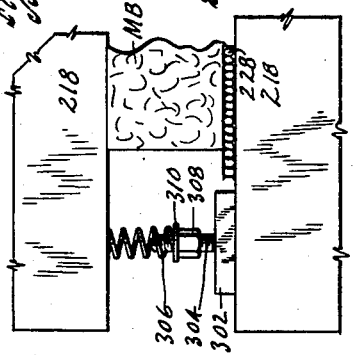
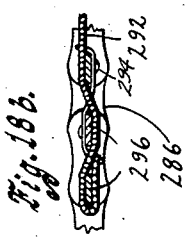
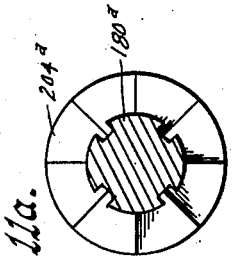
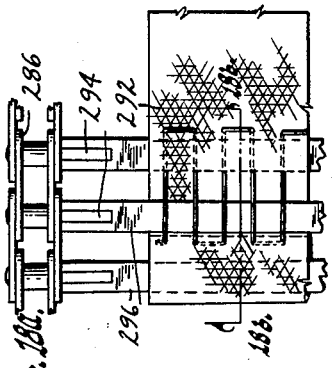
Inventor
~ Orland R. Sweeney ~
By Bair, Freeman & Sinclair
Attorneys
Witness
H. S. Menzenmair June 22, 1937.  O. R. SWEENEY  2,084,980
MATBOARD HANDLING MACHINE
Filed Dec. 31, 1934   9 Sheets-Sheet 2
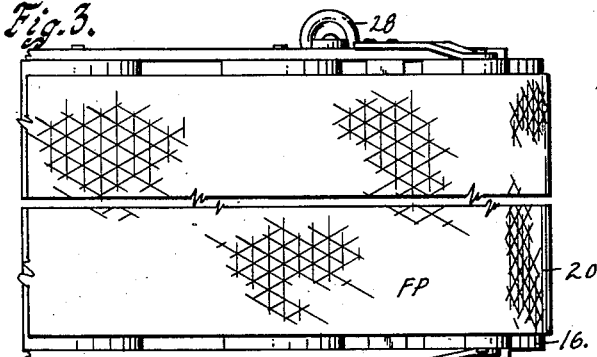
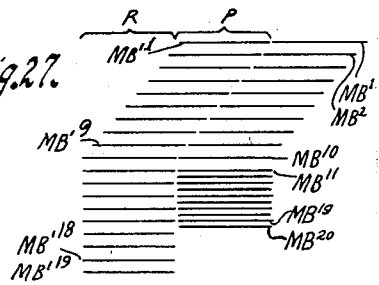
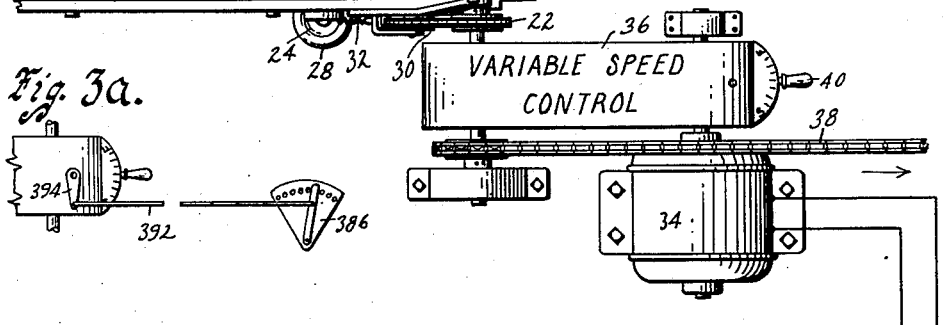
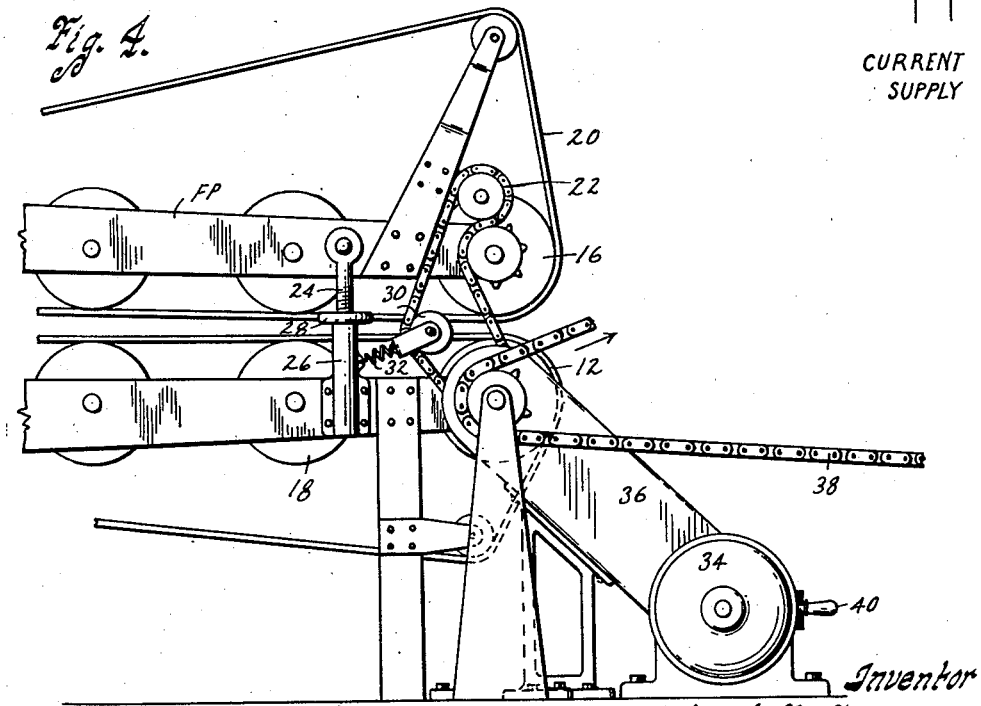

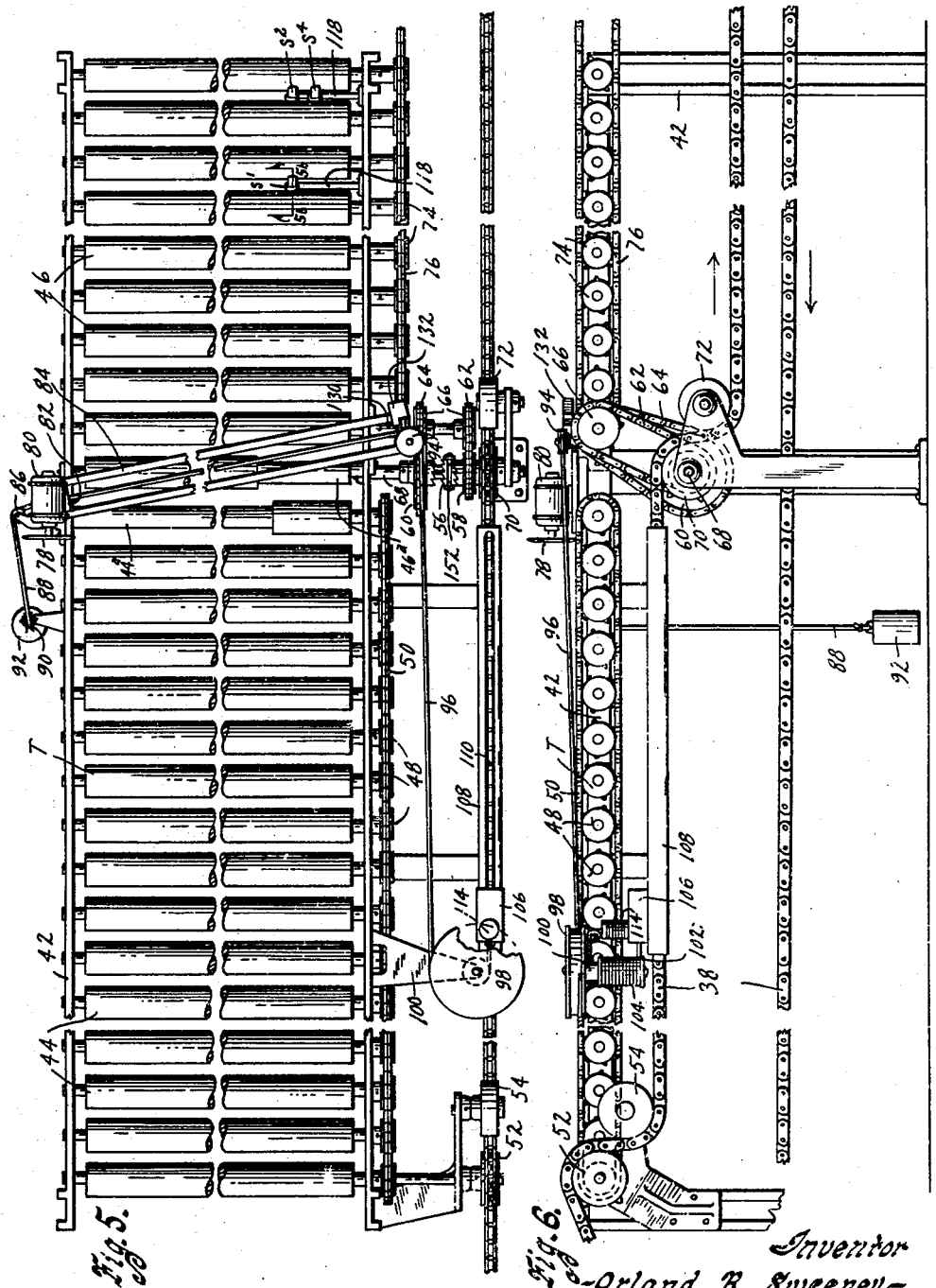

June 22, 1937.　　O. R. SWEENEY　　2,084,980
MATBOARD HANDLING MACHINE
Filed Dec. 31, 1934　　9 Sheets-Sheet 4
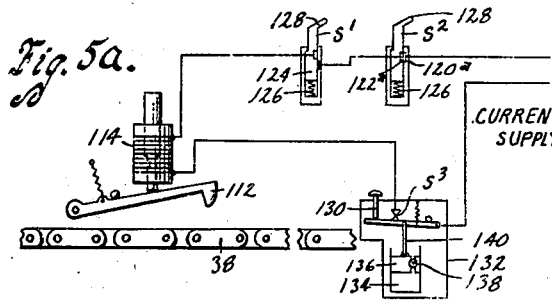
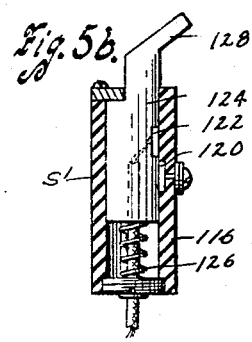
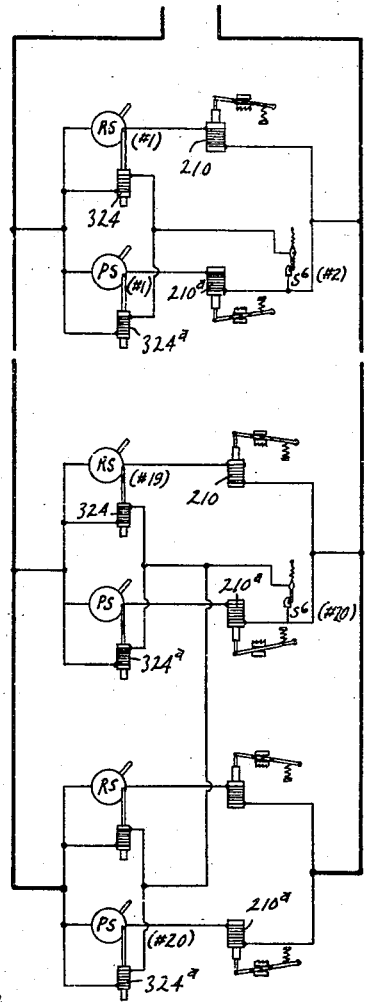
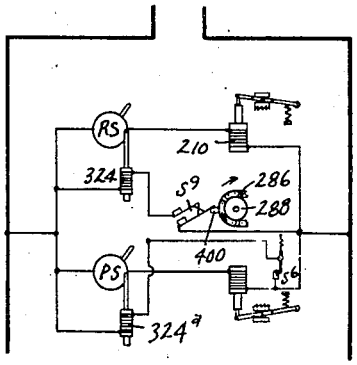
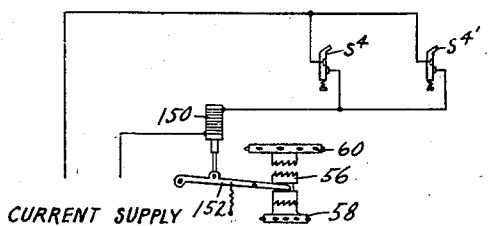
Inventor
Orland R. Sweeney
By Bair, Freeman & Sinclair
Attorneys
Witness
H. S. Munjenmaier June 22, 1937. O. R. SWEENEY 2,084,980
MATBOARD HANDLING MACHINE
Filed Dec. 31, 1934 9 Sheets-Sheet 5

Inventor
Orland R. Sweeney
By Bair, Freeman & Sinclair
Attorneys

Witness

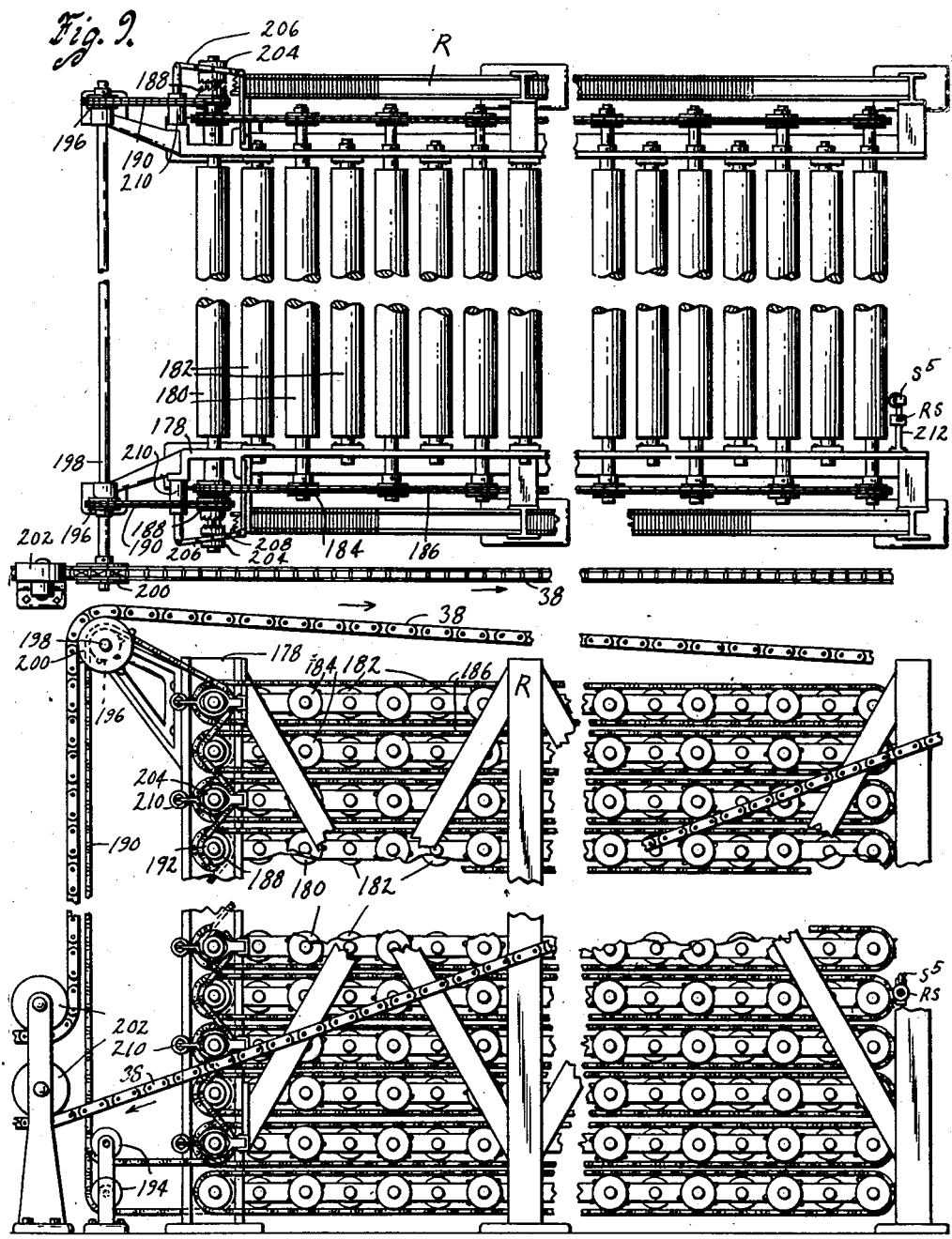

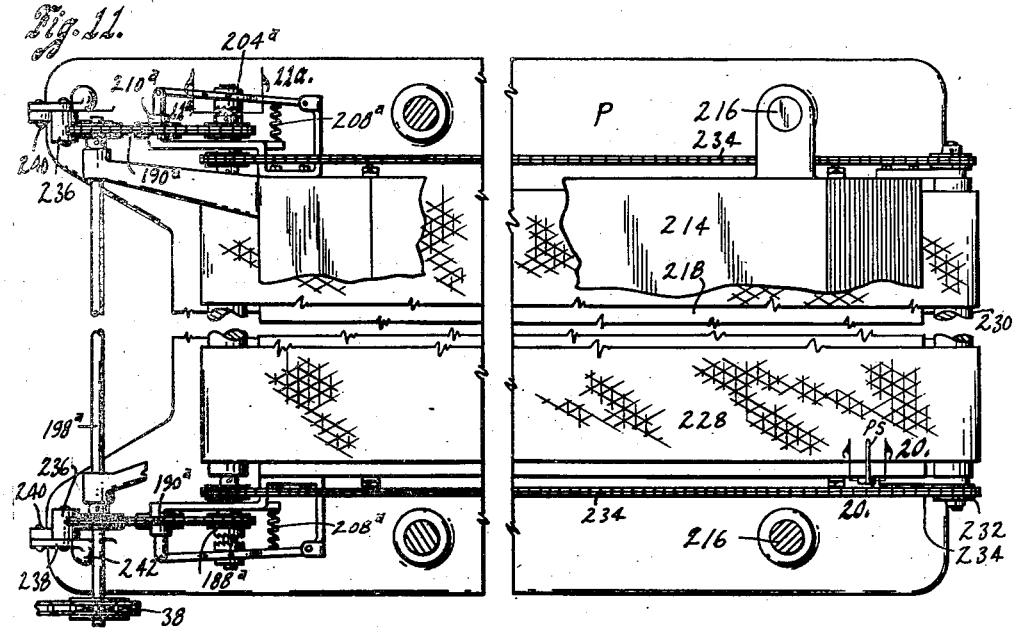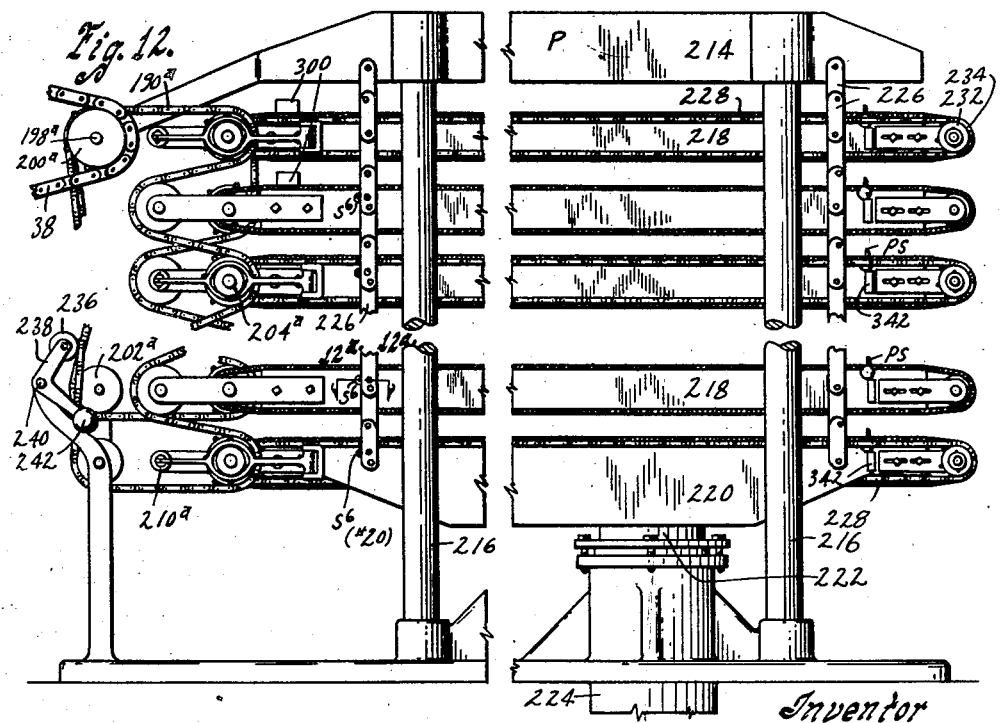

June 22, 1937.   O. R. SWEENEY   2,084,980
MATBOARD HANDLING MACHINE
Filed Dec. 31, 1934   9 Sheets-Sheet 8
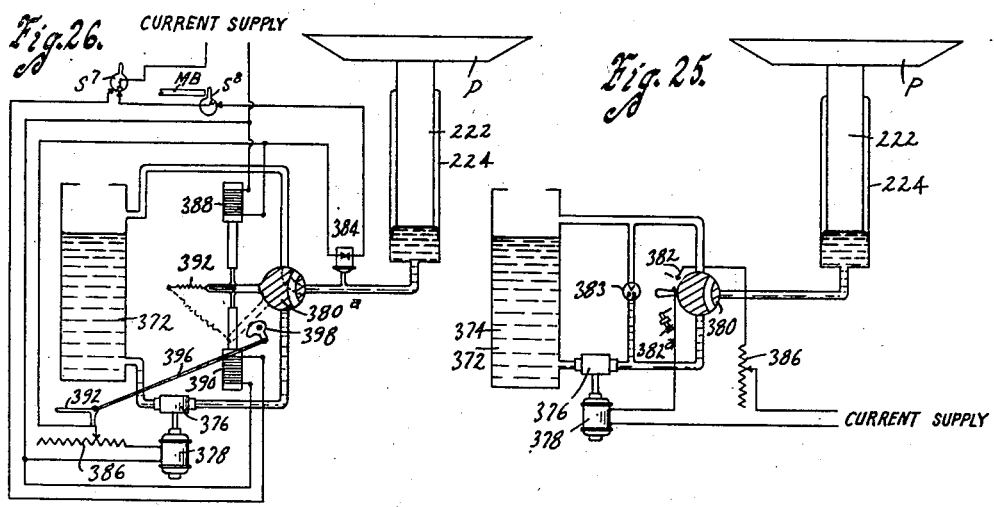
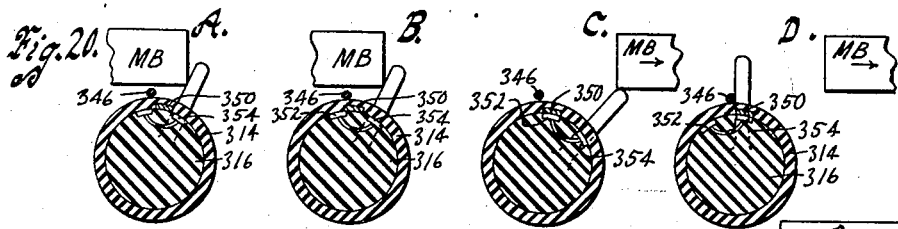
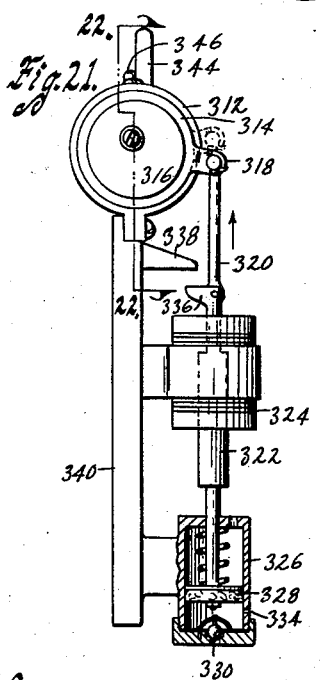
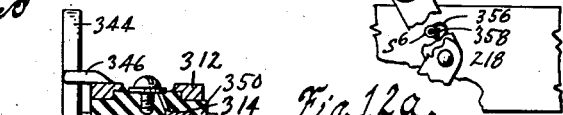
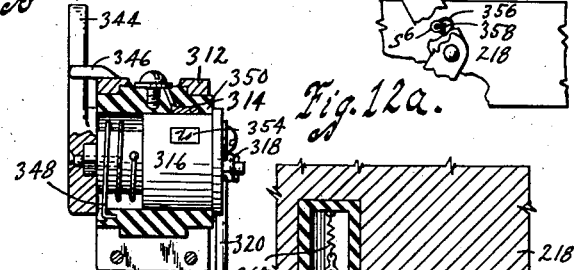
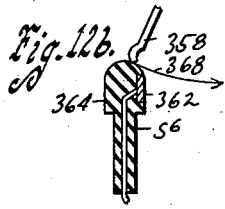
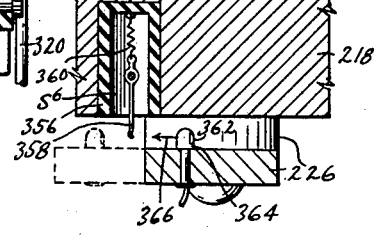
Inventor
Orland R. Sweeney
By Bair, Freeman & Sinclair
Attorneys
Witness
H. S. Kinzenmaier June 22, 1937.  O. R. SWEENEY  2,084,980
MATBOARD HANDLING MACHINE
Filed Dec. 31, 1934  9 Sheets-Sheet 9
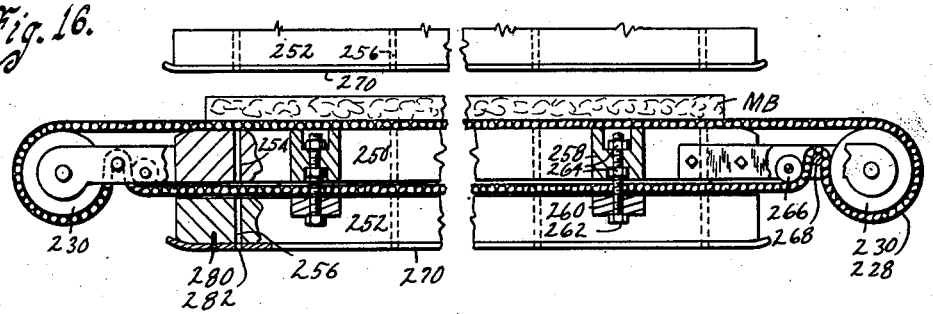
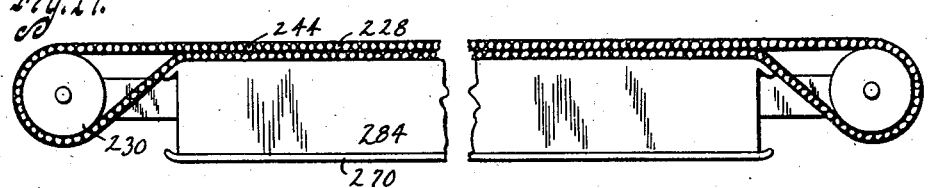
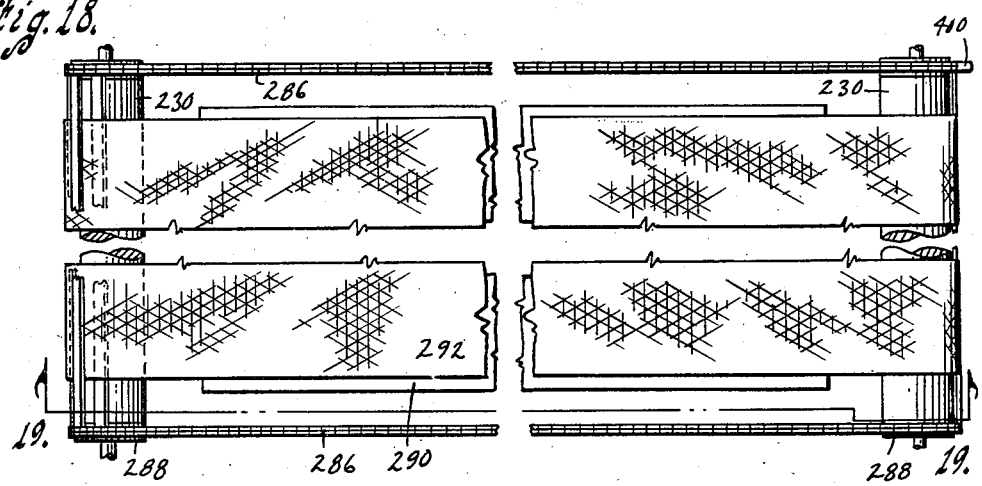
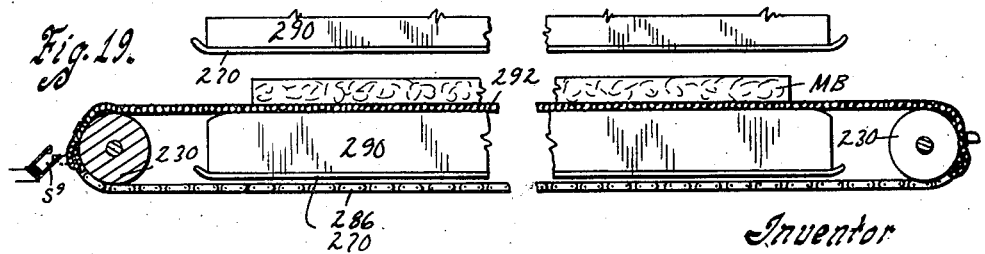

Patented June 22, 1937

2,084,980

UNITED STATES PATENT OFFICE 2,084,980

MATBOARD HANDLING MACHINE

Orland Russell Sweeney, Ames, Iowa, assignor to State of Iowa for benefit of Iowa State College of Agriculture and Mechanical Arts Application December 31, 1934, Serial No. 760,059

30 Claims. (Cl. 92—39)

An object of my invention is to provide a mat board handling machine having a simple and economical arrangement of elements whereby to facilitate the handling of mat boards or similar material whereby the original outlay for machinery is reduced, the number of operators required to operate the machinery is reduced and the elements of the entire machine are synchronized so that mat boards can be completely formed, pressed and dried continuously in the one machine.

The machine or apparatus is suitable for handling synthetic lumber material made from comminuted, partially hydrated pulp, resulting from the proper manipulation of vegetable fibers such as corn stalks, straw, cotton stalks, wood and in general all vegetable fibers. It is a well known fact that these various materials can be pulped, formed into a mat and be suitably pressed and dried to form synthetic lumber. This material is usually used for producing two types of synthetic lumber, one which is a porous, light, fibrous material and generally sold under the name of "insulating lumber" and is sometimes designated by the term "wallboard". This latter term is unfortunate, as it has become associated in the minds of many people with a totally different type of material. One class of this insulating lumber which is manufactured and widely distributed and which will serve as an illustration is the cornstalk insulating board sold under the trade name of "Maizewood".

A second type of material results when the mat is subjected to high pressure in a hydraulic press and is simultaneously heated. When this process is used, there results a dense hard material having many of the properties of hard wood and while it is not highly insulating, it has great strength and physical beauty and for this reason is finding a large use in the arts. This material may be designated as "pressed board" and an illustration of such material is described in my United States Patent No. 1,772,502, dated August 12, 1930.

At the present time, the general practice in the manufacture of both of these classes of materials involves a number of steps in common and while there is a considerable modification in the details of the processes involved, the process for handling the mat boards may be described generally as follows.

The vegetable fibers are shredded by some sort of a suitable machine into comparatively small pieces or chips. These pieces are subjected to a cooking operation in some processes while in others they are merely steamed or treated in the uncooked state. In the cooking process, certain chemicals may be used or merely a water cook may be given. Following the cooking process, or in the case where no cooking is necessary, following the steeping in water, the vegetable fibers are run through a fine comminuting machine, such as the Jordan machine used in the paper industry, or through an especially designed machine which consists of two disks rotating in opposite directions. Between these disks the water and coarse vegetable fibers are caused to pass.

The effect of either of these machines is to defiber the vegetable material, hydrate it and prepare it for formation of the mat. The refined pulp goes from the machines usually to stock chests where it is given certain types of chemical treatment.

One process adds alum and sodium rosinate, thereby giving the fibers a waterproofing coating. Other processes add bentonite or clay and still other processes add asphalt or wax. From this stage the pulp is fed into a forming machine. The forming machine extracts much of the water from the pulp and gives it the form of a thick mat. The mat goes from the forming machine continuously through a set of press rolls which squeezes more water out, reducing the moisture content of the mat usually to about 70%. From this stage on, two different processes are in common use.

In one process, the mat is fed into a drier and comes from the drier completely dried and is ready to be sold for synthetic insulating lumber after trimming. In the second process, the mat is fed between steam heated platens of a suitable press. If only mild pressure is applied within this press, the boards will dry and after drying are ready to be trimmed and sold as insulating lumber. If, on the other hand, the pressure added is higher, for example from 100 to 500 pounds per square inch and heating is practised simultaneously, then the resulting boards are dense and are not sold for insulating materials but are sold for uses requiring greater structural strength.

In following the second general procedure it is common practice today to provide mat handling machinery having the characteristics of 50 the wet operation which will now be described. The wet mat is cut, as it comes from the press into twelve foot lengths. In cases where the forming machine is four feet wide, these boards are then ready to be fed to the hydraulic presses. In some instances, eight foot and twelve foot wide forming machines are used and in these cases the mat coming from the press is usually split into four foot widths, as well as being cut to twelve foot lengths. In any case, the boards, after being cut to four feet by twelve feet plus an allowance for trim, are usually fed by means of a tilting conveyor to a receiving rack.

When eight foot or twelve foot wide forming machines are used and the boards are split into four foot widths as they come from the roll press, it is apparent that before the four foot by twelve foot boards can be individually conveyed onto the tilting conveyor and into the loading rack they must be separated laterally. This requires additional complicated conveying and transferring equipment.

The receiving rack which I will call "Station 1" consists of a number of continuous conveyors arranged one above another. When the receiving rack has been filled, all of its conveyors are started, discharging all of the boards simultaneously into another and movable rack which is so arranged that it may be moved out of the line of the forming machine.

When this movable rack has been filled, it is transferred out of the line to a point which I will designate as "Station 2" and another movable rack is placed in line to receive boards from the stationary receiving rack. As soon as an empty hydraulic press is available the movable rack at Station 2 is moved into position to feed the hydraulic press and I will designate this position as "Station 3." Each hydraulic press has as many openings between steam heated platens as the movable rack has conveyors and between each pair of the platens is a wire conveyor for carrying the mat from the movable rack into the press and for discharging the finished board from the press.

In loading the hydraulic press, all the conveyors of the movable rack and of the press are started and all of the boards are loaded into the press simultaneously. The press is then closed and the boards are pressed and dried. Upon the completion of these operations, the press is opened, the press conveyors are started and all of the boards are unloaded simultaneously.

My invention contemplates the provision of a mat handling machine which is a substantial improvement over the machinery just described.

One object of my invention is to provide a machine which eliminates the necessity of transferring the wet mats out of the line of the forming machine to another point at which they are fed to hydraulic presses.

This is accomplished by an arrangement which makes it possible to continuously feed the wet mats into a loading rack and hydraulic press both located in line with the forming machine. It can readily be seen that such an apparatus would eliminate the expensive and complicated movable racks with the tracks and turntables required for such racks. Such an apparatus also would require less handling and moving of the wet mats and would therefore tend to give an improved product since the wet mats are apt to be weakened by moving and handling.

Another important advantage of this apparatus is that it makes possible better control of the various operations. This is true because of the fact that the operation of the forming machine, press, tipple conveyor, loading rack conveyors and hydraulic press conveyors are all synchronized and may be controlled by one operator.

Thus let us assume that the operator observes that the boards are leaving the hydraulic press slightly underdried. All that is necessary for him to do in such a case is to change the setting of a variable speed drive and in that way reduce, in one operation, the speed of the forming machine, press, tipping conveyor, loading rack conveyors and hydraulic press conveyors, thus decreasing the output of the system and making it possible to leave the boards in the hydraulic press for a longer period.

Conversely, if the boards are leaving the press in an overdried condition, the operator sets the variable speed drive in the opposite direction to slightly increase the speed of the various units of the machine. The simplified control of the apparatus reduces the number of operators and workmen required and thus results in economies and lowered operating costs. It also makes possible the operation of the system at the maximum capacity of the hydraulic press used in the apparatus.

Another object is to provide a design of conveyor wire for the hydraulic press which results in improved drying conditions.

Still another object is to provide modified forms of platens in the hydraulic press which improve drying conditions.

Still another object is to provide a modification of the hydraulic press construction which produces better drying conditions and better control of the pressure applied to the mat boards from the top to the bottom of the hydraulic press by the use between the platens of springs of adjustable tension to permit the upper platen to contact the mat board during the entire drying process and at the same time prevent the application of excessive pressure.

Still another object is to synchronize all parts of the apparatus so that the parts can be instantly adjusted for increased production and reduced drying and pressing time, or decreased production and increased drying and pressing time, as desired.

A further object is to provide a unitary apparatus preferably arranged with the elements thereof in a line extending from the mat forming machine to the discharge conveyor from the hydraulic press so that mat material which is continuously formed in the forming machine may be continuously cut into proper lengths and handled through the hydraulic press without any interruption of the forming machine required for opening and closing the press.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a diagrammatic plan view of an apparatus embodying my invention, parts thereof being already old but being illustrated to show how such parts can be synchronized with my specific improvements.

Figure 2 is a diagrammatic front elevation of Figure 1.

Figure 3 is a plan view of the discharge end of a forming press showing a variable speed control associated therewith and provided for operating synchronously all the remaining elements of the entire apparatus.

Figure 3a is a plan view of a modification of the variable speed control.

Figure 4 is a front elevation of Figure 3.

Figure 5 is a plan view of a conveyor table of the apparatus.

Figure 5a (Sheet 9) is an electro-diagrammatic view of controlling means for a knife of Figure 5.

Figure 5b is a sectional view on the line 5b—5b of Figure 5.

Figure 5c is an electro-diagrammatic figure of a speeding up control for a portion of the table conveyor on the outgoing side of the cutoff knife and for a tipping conveyor.

Figure 6 is a front elevation of the conveyor table.

Figure 9 is a plan view of a loading rack of the apparatus.

Figure 10 is is a front elevation of Figure 9.

Figure 11 is a plan view of a main press of the hydraulic type.

Figure 11a (Sheet 1) is an enlarged sectional view on the line 11a—11a of Figure 11.

Figure 12 is a front elevation of Figure 11.

Figure 12a (Sheet 8) is an enlarged sectional view on the line 12a—12a of Figure 12.

Figure 12b is an enlarged sectional view of a part of Figure 12a.

Figure 12c is an enlarged view of a portion of Figure 12 as adjacent the line 12a—12a.

Figure 13 (Sheet 1) is an enlarged plan view of a section of a conveyor used in the press of Figure 12, the parts being on a scale greater than full size.

Figure 14 is a sectional view on the line 14—14 of Figure 13 illustrating the purpose of the specific construction shown in Figure 13.

Figure 15 is a front elevation of a portion of two platens of the hydraulic press showing a modification.

Figures 16 and 17 are front elevations, Figure 16 being partly in section and showing modified forms of the press platen and conveyor construction.

Figure 18 is a plan view of another modified form of a press platen and conveyor.

Figure 18a (Sheet 1) is a detailed enlarged plan view of the upper left corner of Figure 18.

Figure 18b is a sectional view on the line 18b—18b of Figure 18a.

Figure 19 is a sectional view on the line 19—19 of Figure 18.

Figure 20 is a sectional view on the line 20—20 of Figure 11 showing four different positions (A, B, C and D) of an electric contact controller.

Figure 21 is a front elevation of the controller shown in Figure 20 and parts associated therewith as viewed from the left side of Figure 20.

Figure 22 is a sectional view on the line 22—22 of Figure 21 showing additional details of the controller.

Figure 23 (Sheet 9) is an electro-diagrammatic view of controlling devices for the loading rack and hydraulic press conveyors.

Figure 24 is a modified view similar to Figure 23 required for the type of conveyors shown in Figures 18 and 19.

Figure 25 is a diagrammatic view of a manual controlling means for the hydraulic press.

Figure 26 is a similar view of an automatic controlling means for the press; and Figure 27 is a diagrammatic view showing how mat boards are consecutively loaded into and discharged from the main press of my apparatus.

Figure 7:
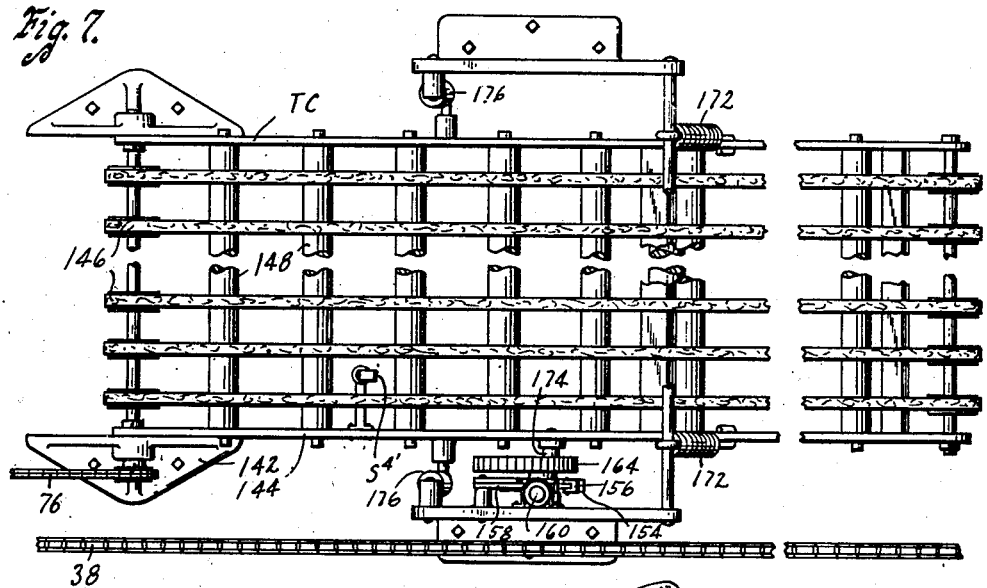
Figure 7 is a plan view of a tipping conveyor.

On the accompanying drawings, I have used the reference character F to indicate a forming machine and FP a forming press. These are shown diagrammatically in Figure 1, while the discharge end of the forming press is shown more in detail in Figures 3 and 4. The forming machine and the forming press may be of any standard design commonly in use such as the double cylinder type, the single suction cylinder type or the suction box type, the latter being described in my United States Patent No. 1,814,268, issued July 14, 1931. The forming machine F should be of the proper width for making a standard width board with suitable allowance for trim. In the United States, this width is four feet.

The forming machine comprises briefly a nozzle 10 for the wet pulp which is deposited on a traveling conveyor 12. The moisture content of the pulp is approximately 97.5 percent and is reduced to approximately 88 percent by reason of the conveyor, which is perforated, passing over the top of a suction box 14. The pulp is formed into a mat in the forming press FP.

The thickness of the mat depends upon the density and kind of board which it is desired to produce. For example, if a ⅛th inch thick "pressed board" is desired, the thickness of the mat on the forming machine would be about 1¼ inches.

If a ½ inch thick "insulation board" is desired, the thickness would be about 1¼ inches. If thicker or thinner boards of either of these classes are desired, the thickness of the mat on the forming machine would be varied accordingly.

The forming machine described in the patent last mentioned is particularly desirable since its design permits it to be easily adjusted to produce boards of a wide range in width and since it embodies many other features described in the patent which make it particularly well adapted for a mat forming process for forming mats of the kind which are best handled by the handling apparatus of my present invention.

From the forming machine F, the mat passes through the forming press FP which compresses it, reduces its moisture content to about 70 percent and gives it increased strength. A suitable press for accomplishing this work consists in general of a number of sets of squeeze rolls, each set being so adjusted as to put slightly more pressure on the mat than the preceding set. In Figure 2, these rolls are indicated at 16 and 18, respectively, a conveyor belt 20 being associated with the rolls 16 and the conveyor belt 12 being associated with the rolls 18. The belts 12 and 18 are driven and synchronized by a chain 22. (See Fig. 4.)

The conveyor belts 12 and 20 can be adjusted for the thickness of the mat as by a threaded rod 24 telescoping in a sleeve 26, an adjusting nut 28 being provided for adjusting one longitudinally relative to the other. Because of such adjustment, the length of the chain 22 must be varied and this may be compensated for by providing an idler pulley 30 maintained under tension by a spring 32.

For driving the forming machine and the forming press and also the other mechanism which will be later described, it is desirable to have one source of power such as an electric motor 34 and drive the various units of the entire apparatus through a variable speed control mechanism 36 such as a set of reeves from a main chain 38. A control handle 40 may be provided as a means for changing the speed of the main chain 38 and consequently all units of the apparatus so that production can be speeded up when the mat boards are coming from the main press in too dry a condition or slowed down when they are coming therefrom in too wet a condition.

Since the variable speed control can be of any suitable character, it is deemed unnecessary to illustrate it in detail as many controls of this character, usually of the split cone pulley and belt type, are on the market.

The mat, as it comes from the forming press FP, is discharged onto a table T across which it is conveyed, the table T consisting of a frame 42 on which is journalled two sets of rolls. The rolls of the first set are indicated by the reference numeral 44, while the rolls of the second set are indicated by the reference numeral 46. The rolls 44 each have associated therewith a sprocket 48 around which a drive chain 50 extends for driving all of these rolls simultaneously. The chain 50 is continuously driven from the main chain 38 through a sprocket 52 mounted on the shaft of one of the rolls 44. An idler 54 is provided for increasing the traction of the main chain 38 on the sprocket 52.

The rolls 46 are driven through a clutch element 56 from the main chain 38 which is selectively engageable with sprockets 58 and 60. The sprockets 58 and 60 are connected by chains 62 and 64 with sprockets 66 mounted on the shaft of one of the rolls 46. The sprockets 58 and 60 are of different sizes, while the sprockets 60 may be of the same size.

The clutch element 56 is slidably and non-rotatably mounted on a stub shaft 68 having thereon a sprocket 70. The sprocket 70 is driven from the main chain 38 in a manner similar to the sprocket 52, an idler 72 being provided corresponding to the idler 54. The rolls 46 are provided with sprockets 74, all driven simultaneously by a chain 76.

From the construction of the parts just described, it will be obvious that when the clutch element 56 is in the position of Figure 5, the rolls 46 will be driven at the same speed as the rolls 44, but when the clutch element is adjusted to a position where it engages with the sprocket 60, these rolls will be speeded up.

Associated with the table T is a knife 78 for cutting the continuously conveyed wet mat into mat boards of the desired length. The knife 78 is ordinarily rotary in character and driven by an electric motor such as indicated at 80. The knife is mounted on a carriage 82 which may travel along an angularly arranged track 84, suitable means being provided for synchronizing its travel along the track with the travel of the wet mat and mechanism being arranged to periodically cause such travel in accordance with a desired length of mat passing the knife. One form of such mechanism that can be used will now be briefly described.

A pulley 86 is mounted on the track 84 and a cable or other flexible element 88 extends from the carriage 82 around this pulley and then around another one 90 and has a weight 92 attached thereto. The weight 92 normally constrains the carriage 82 toward the rear end of the track 84 as shown in Figure 5.

Another pulley 94 is mounted on the track 84 and a flexible element 96 extends from the carriage 82 around this pulley to a drum 98. The drum 98 is journalled with respect to a bracket 100 of the frame of the table T.

A drum of smaller diameter 102 is secured to the shaft of the drum 98 and a flexible element 104 is wound thereon. One end of this element is secured to a slide 106 guided along a track 108 having a slot 110 therein. Within the slide 106 is a hook 112 (see Figure 5a) normally raised but capable of being lowered when a solenoid 114 is energized. When lowered, it engages the main chain 38 so that the flexible element 104 will be unwound from the drum 102 for winding up the flexible element 96 and pulling the knife 78 forwardly in synchronism with the rotation of the rolls 44.

The parts are so designed of course and the angle of the track 84 is such that the knife 78 in traveling from side to side of the table T travels longitudinally of the table at the same rate as the mat.

For energizing and de-energizing the solenoid 114, I provide switches $S^1$, $S^2$ and $S^3$. The switch $S^1$ (see Fig. 5b) comprises a casing 116 preferably formed of insulation and mounted on a bracket 118. A stationary contact 120 is embedded in the wall of the casing, while a movable contact 122 is carried by a depressible plunger 124 normally held raised by a spring 126.

The plunger 124 has an inclined finger 128 designed for the mat to strike and cause depression of the plunger to engage the contacts 120 and 122. The switch $S^2$ is similar to the switch $S^1$ except it has contacts 120a and 122a normally engaged and disengageable when the plunger is depressed.

The switch $S^3$ is normally engaged (see Figure 5a) and has an operating pin 130 located to extend from a housing 132 as shown in Figure 5, so that it will be struck by the carriage 82 at the completion of its cutting stroke. Means is provided for delaying the closing of the switch $S^3$ when it is once opened which may consist of a cylinder 134, a piston 136 and a check valve 138. This arrangement is connected by a link 140 with the switch $S^3$ so that the check valve permits flow of air when the contacts of the switch are separated but prevents flow or at least restricts it to such an extent that the contacts of the switch do not close quickly when once opened.

The switches $S^1$, $S^2$ and $S^3$ are arranged so that the switch $S^1$ when struck by the advancing edge of the mat will close the circuit through the solenoid 114 for starting the knife 78 on its cut through the mat. At the completion of the stroke of the knife, the solenoid 114 should be de-energized so that the hook 112 will raise and permit the weight 92 to return the knife.

The switch $S^3$ accomplishes this result, while in order to maintain the circuit broken, the switch $S^2$ is provided as the switch $S^3$ breaks the circuit only momentarily. The retarding arrangement for closing of the switch $S^3$ provides a little leeway, during which time the knife may start on its return, but the contacts of the switch $S^3$ will remain open until the advancing edge of the mat strikes the switch $S^2$ and then maintains the circuit broken even though the contacts of the switch $S^3$ close again. During the return stroke of the knife, it is automatically lifted so as not to cut through the mat on the return stroke, but this is general practice in knives of this character and no mechanism has been illustrated for this purpose on the drawings.

The mat board cut off from the mat by the knife is immediately speeded up after striking the switch S² so as to get this board away from the knife (and for another purpose which will hereinafter appear) so that the switch S² can return to its normal position in plenty of time so that the next advancing edge of the mat produced by cutting a mat board off the mat will be able to close the circuit of the solenoid 114 when it depresses the switch S¹. The knife 78 cuts the mat transversely into any desired length, the commonly preferred length being twelve feet plus an allowance for trim since this length gives a board which may be readily recut to many standard sizes and since this has come to be adopted as a standard size for the hydraulic presses used in this work.

Figure 8:
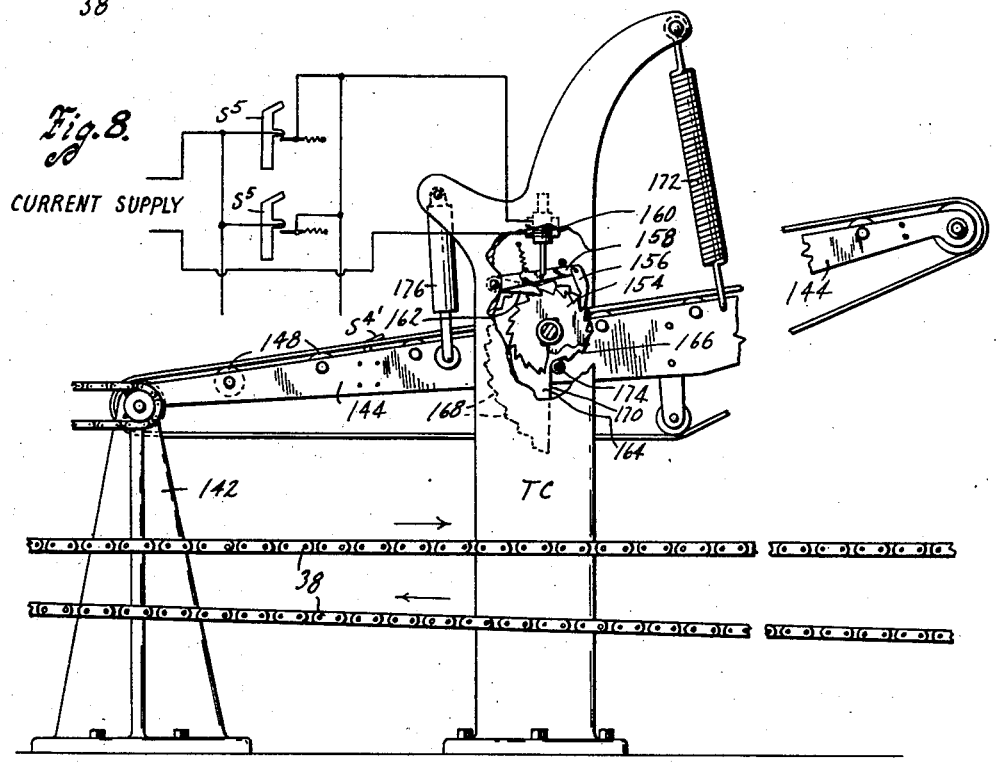
Figure 8 is a front elevation of Figure 7 and includes an electrical diagram of controlling means therefor.

The next unit of my apparatus is a tipping conveyor TC shown in detail in Figures 7 and 8. It consists of a bracket 142 having a conveyor frame 144 pivoted thereto. The tipping conveyor includes laterally spaced endless belts 146 running over rolls 148 and driven by the drive chain 76 of the table rolls 46 so that the tipping conveyor may at times be speeded up simultaneously with the rolls 46.

After the knife 78 completes its cut and opens the switch S³, the switch S² is depressed as described and also another one S⁴ adjacent it is depressed. The switch S⁴ is similar to the switch S¹ and there is also provided a switch S⁴' on the tipping conveyor TC.

As soon as the mat board cut off the mat strikes the switch S⁴, the circuit is closed through a solenoid 150 (see Figure 5c) for swinging a clutch arm 152 associated with the clutch element 56 of Figure 5. This speeds up the rolls 46 and the conveyor belts 146 until the mat board has completely traversed the switch S⁴', the board striking the switch S⁴' before it leaves the switch S⁴ to maintain the speeded up condition of this section of the apparatus until just before the mat board starts to leave the tipping conveyor.

Means is provided for operating the tipping conveyor so that it drops a slight distance after each discharge of a mat board therefrom and after discharging a predetermined number, it swings upwardly again and repeats this cycle.

Such means is shown illustratively as a ratchet wheel 154 driven by a pawl 156, a pawl arm 158 and a solenoid 160. A holding pawl is indicated at 162. Operatively connected with the ratchet wheel 154 is a cam 164 having radial portions 166, slight riser portions 168 and a single drop portion 170. The solenoid 160 rotates the ratchet wheel and the cam clockwise step by step in an obvious manner.

Springs 172 are provided for retaining a roller 174 of the conveyor frame 144 against the cam 164, while check devices 176, for instance of the hydraulic type, may be provided for preventing too violent a dropping of the roller 174 along the drop portion 170 toward the shaft of the ratchet wheel and cam when this drop portion registers with the roller 174.

For energizing the solenoid 160, a plurality of switches S⁵ are provided, each of which is depressible by a mat board engaging it in the manner described for the switch S¹ and which momentarily makes a circuit when depressed but does not make it when it again rises. The construction of the contacts of each switch S⁵ is similar to a switch S⁶ which will later be described. There is a switch S⁵ for each section of a loading rack R which will now be described.

The loading rack is shown in Figures 9 and 10 and consists of a frame 178 in which is journalled a plurality of driven rolls 180 and idler rolls 182. The rolls are arranged in vertical and horizontal rows and so spaced so that above each horizontal row there is a space to receive a mat board. As shown in Figure 2, the tipping conveyor TC discharges mat boards into these spaces and obviously by tipping the tipping conveyor step by step by the ratchet and pawl mechanism at 154 and 156, the spaces can be consecutively filled.

For driving the rolls 180, sprockets 184, chains 186 and sprockets 188 are provided. The sprockets 188 are driven by chains 190 extending around these sprockets and around idlers 192 and 194 and drive sprockets 196. The drive sprockets 196 are mounted on a drive shaft 198 having thereon a sprocket 200 driven by the main drive chain 38. Idlers 202 are also provided for the drive chain 38 to properly direct it toward the sprocket 200 and other parts of the apparatus.

Two of the drive chains 190 are provided, one on either side of the loading rack R. The drive sprockets 188 normally idle on the shaft of the first roll 180 of each horizontal row of rolls, the drive sprockets 188 being alternately arranged on opposite ends of these shafts—that is, on one side of the machine these sprockets being on the even numbered shafts and on the other side of the machine being on the odd numbered shafts. Thus each set of rolls is driven from the opposite side of the machine to make room for the idlers 192.

Clutch elements 204 are slidably and nonrotatably mounted on the shafts mentioned and are normally held disengaged from clutch jaws of the drive sprockets 188 by clutch levers 206 and springs 208. Solenoids 210 are provided for engaging these clutches, there being one solenoid for each horizontal row of rolls whereby each conveyor of the loading rack R may be operated independently.

The switches S⁵ of Figure 8 are mounted on brackets 212 of the loading rack, there being one switch for the front end of each conveyor of the loading rack. Consequently when the first mat board enters the loading rack, it strikes the switch S⁵ of the topmost conveyor thereof for rotating the cam 164 of Figure 8 one step, thus dropping the tipping conveyor TC so that the next mat board will be conveyed onto the second conveyor of the loading rack and this operation is repeated until the last conveyor of the loading rack is filled, whereupon the cam completes one revolution and the tipping conveyor swings again to its raised position for refilling the loading rack the mat boards of the loading rack being previously removed as will hereinafter more fully appear.

The next unit of my apparatus in the line of operations is the main press indicated generally at P. This may consist of a top platen 214 mounted stationarily as on posts 216, intermediate platens 218 and a bottom platen 220. The bottom platen 220 is operated by a hydraulic ram 222 in a cylinder 224. The intermediate platens 218 may be evenly spaced when open by an arrangement of pivoted links 226.

Conveyor belts 228 encircle the platens 218 and 220 and these are driven by suitable rolls 230, sprockets 232 and chains 234.

One roll of each platen is driven through a clutch and chain arrangement similar to that of the loading rack R and therefore the elements of the press similar to those of the rack will be given the same reference numerals with the addition of the distinguishing characteristic a.

Since the platens are movable, some provision must be made for taking up the slack in the chains 190a and this may be in the form of idlers 236 mounted on arms 238 pivoted at 240 and provided with weights 242.

The conveyor belts 228 are formed of a wire of special design illustrated in Figures 13 and 14. This wire, which may be made of stainless steel, phosphor bronze, or other corrosion resistant metal, has several important advantages over conveyors ordinarily used for this purpose. It consists of a series of spirally-shaped wires 244 similar to open coil springs and so arranged that the spirals interlock. Straight reinforcing rods 246 are threaded through the coils 244 and run transversely of the conveyor belt 228 as illustrated. The purpose of the reinforcing rods is to prevent undue narrowing and stretching of the conveyor belt. By tests I have found that the coils of the spirally-shaped wires 244 will become elliptical and the length of the conveyor belt will become greater and thereby its width will become narrowed under tension caused by conveying the mat boards until it is unfit for use.

The specific construction of the conveyor wire 228, as just described, enables it to take sharp bends without putting any bending stresses on the individual elements of the conveyor belt. This results because in making a bend, the coils 244 simply turn on one another and on the reinforcing rods 246 and the wires of the coils are themselves not subjected to bending whatsoever. This is an important feature since the service to which the conveyors are put makes it necessary for them to take sharp bends in passing around rolls of relatively small diameter, such as are necessary on the type of press P illustrated. It can readily be appreciated that the use of this particular type of construction greatly increases the life of the conveyor belts with consequent lowering of the operating costs.

A very important advantage arising from the use of this type of construction is that it permits the steam which is generated in drying the mat boards to escape more readily than is possible when the usual flat type of wire cloth is used. Wire cloth is comparatively flat and offers but little lateral space through which the steam driven from the mat boards can escape, whereas as shown in Figure 14, comparatively large openings indicated at 248 are present through which even an excess of steam can readily escape.

In this figure, the surface of the platen 218 is represented as a line and the mat board is indicated at MB. The mat board being wet and under pressure will, of course, cause the coils 244 to be embedded somewhat in its surface, making a rough pattern on such surface, the usual degree of embedding being illustrated in this figure.

Figures 13 and 14 have been greatly magnified (about seven or eight times) to illustrate the effectiveness of this construction for providing sufficient area through which steam may escape. The better removal of steam resulting from the use of my conveyor construction gives a resulting mat board product of improved quality and shortens the time required to dry the board, thus speeding up production as the drying time for the mat boards in the press P is the controlling time factor relative to which all other operations of my apparatus are synchronized. Obviously with shorter drying periods of time, there is increased press capacity with corresponding economies of operation.

By the particular arrangement of conveyor belts 228 on opposite sides of the platens 218 in Figure 12, a rough surface caused by the pattern of the conveyor belts 228 being impressed on the mat board is produced on each face of the board.

In Figures 16 to 19, I illustrate modifications wherein it is possible to produce a mat board with this pattern in one face only, the other face being smooth or impressed with some other pattern if desired. Also, in these figures, constructions are shown which further facilitate the escape of steam with further reduction of the drying time and improvement of the product. One of these modifications is illustrated in Figure 16 wherein I use a drilled split platen which permits the ready escape of steam from both surfaces of the mat board MB during drying.

The platen consists of two sections 250 and 252. These are drilled as indicated at 254 and 256 and the two sections of the platen are assembled together with slight lost motion between them in any desired manner. By way of illustration, I show bosses 258 on the platen section 250 and bosses 260 on the platen section 252. A headed bolt 262 extends loosely through each boss 260 and is rigidly assembled relative to the bosses 258 by means of lock nuts 264. As shown in Figure 16, when the press is open, the platen section 252 is supported on the platen section 250, the section 250 being supported in the ordinary manner such as by means of the links 226 of Figure 12.

The conveyor belt 228 extends over the rolls 230, the same as previously described and also over idlers 266 and 268 whereby sufficient traction is provided for the conveyor belts on the rolls 230 and the lower stretch of the conveyor belt is directed to pass between the platen sections 250 and 252. The lost motion connection at 262 permits the two halves of the split platen to open sufficiently for the stretch of the conveyor chain between them to move when the press is open, the chain acting as a spacer when the press is closed and the lost motion is taken up.

On the lower face of each platen section 252, a smooth plate 270 is secured as by countersunk screws 280 and it is drilled with openings 282 registering with the drilled openings 256. The plate 270 may, if desired, be highly polished or plated to secure a very smooth surface on one side of the mat board, or instead it can have some configuration or design thereon if desired for impressing such configuration or design on the top surface of the mat board MB.

The type of conveyor construction shown in Figure 17 permits ready escape of steam from the lower surface of the mat board through the coils 244 and also through the openings 254 to the lower stretch of the conveyor belt and then laterally through the coils thereof. From the upper surface of the mat board, the steam may escape through the drilled openings 282 and 256 and then laterally through the lower stretch of the conveyor belt. It can readily be seen that this constitutes a very important improvement in the drying of the board.

One objection to the use of platens of the type just described arises from the fact that the holes which are drilled in the bottom half of the platen section 252 and which extend through the plate 270, make small marks on the smooth polished surface of the board. If these marks are objectionable, the holes in the plate 270 and the platen section 252 may be eliminated, using this construction to aid in the removal of steam only through the platen section 250.

A conveyor which may be used in conjunction with the conventional solid type of platen is illustrated in Figure 17 wherein the platen is designated with the reference numeral 284. The lower stretch of the conveyor belt, instead of moving below the platen, goes above it (between the upper stretch of the belt and the platen). This leaves the lower surface of the platen free of any conveyor belt so that the plate 270 can be secured thereto without being overlayed with a stretch of the conveyor belt as shown in Figure 12 and without the necessity of splitting the platen as in Figure 16.

Another type of press platen, such as shown in Figures 18 and 19, may be used. This may be called a side chain half length conveyor. It consists of two endless roller chains 286 passing around sprockets 288 located on both sides of a platen 290. The sprockets 288 are secured to the shafts for the rolls 230 so as to rotate simultaneously with them.

The conveyor is designated at 292 and comprises a length of the special spiral coil and reinforcing rod type of conveyor belt about half the length of the belt of Figure 12. Diametrically opposite each other on the chains 286, about three links of the chain as shown in Figures 18a and 18b are provided with extensions of their pivot pins indicated at 294. These are split to receive flat bars 296 which may be welded or otherwise secured in place and the ends of the conveyor wire 292 are laced over, under and around these three flat bars 296 as shown in Figure 18b. These ends may be secured to the bars as by piano or picture wire 298 sewed through the conveyor belt and over and under two of the bars 296 as illustrated. This type of fastening is only by way of illustration as any equivalent found feasible can be substituted therefor.

The construction just described arranges the axes of the bars 296 coincident with the axes of the pins 294 since in this way the distance between the bars remains constant as they pass around the rolls 230 and results in no undue strain being put on the fastening of the conveyor wire to the bars.

If it is desired to manufacture insulating boards, stops 300 of definite thickness such as indicated at the left end of the upper two platens 218 in Figure 12, may be used between the platens so that the full weight of the platens will not be exerted on the mat boards while drying since such weight would give a denser product than that desired.

In the present state of the art, it is common practice to use such stops between the platens. These stops are commonly made slightly thicker than the finished board thickness desired in order to offset the final slight shrinkage which takes place in the board as it becomes dry and which causes it to draw away slightly from the press platens. For example, if the finished board thickness is to be ½ inch, it is common practice to use metal stops having a thickness of $\frac{17}{32}$ inch. Experience has proven that if the platens are left in contact with the wet mat during the entire drying process, better drying efficiency results, a shorter drying time is required and the capacity of the press is thus increased.

In order to accomplish this desirable result, I prefer to employ stops like those illustrated in Figure 15 (Sheet 1). This stop consists of a base block 302 with a threaded stud 304 extending therefrom. A coil spring 306 encircles the stud and an adjusting nut 308 is provided for adjusting the tension of the spring 306. At 310 a washer is illustrated interposed between the spring and the nut.

In using this type of stop, the nut is tightened until the tension in the spring is just sufficient to permit the weight of the platen to compress the board to the desired thickness, at the same time maintaining contact between the board and the platens during the entire drying period.

It is obvious that the stops near the bottom of the press will require greater tension than those near the top because of the weight of the greater number of superimposed platens which they are carrying. The desired tension may be easily secured while the press is in operation and while the operator is observing the mat board by simply adjusting the nut 308.

If it is desired to make a hard, dense, pressed board instead of an insulating board, no stops are used and a pressure of 100 to 500 pounds per square inch is exerted on the platens during the drying period.

Still a third type of board is produced by pressing the wet mat at a pressure of 300 to 600 pounds per square inch with the press platens cold and then drying the resulting mat in any suitable drier, as for example, the continuous roller conveyor type. Boards made in this manner may be produced in any desired thickness, have considerably greater strength than the ordinary insulation board, but may have somewhat lower insulation value. They have, however, much higher insulation value than pressed board.

At the discharge end of the main press P, a discharge conveyor DC is shown in Figures 1 and 2. This may merely consist of freely rotatable rollers 310 arranged to incline downwardly from the press so that when the mat boards are discharged thereon, they will move along this conveyor by gravity and can be removed from the conveyor by workmen and placed on trucks or the like or automatically conveyed and stacked or stored if desired.

Referring to Figures 9 and 10, a controller switch RS is shown and in Figures 11 and 12, a similar switch PS is shown. In Figures 20, 21 and 22, these switches are illustrated in detail. There is a switch RS for each conveyor of the loading rack R and a switch PS for each conveyor of the press P. Each of these switches comprises a casing element 312 having oscillatably mounted therein a sleeve 314 preferably of insulation material and within the sleeve 314, a plug 316 also preferably of insulation material.

The sleeve 314 has an extension 318 with which a link 320 is connected. The link 320 is connected with a core 322 of a solenoid 324. A means for retarding the return of the core 322 after the solenoid 324 has been energized and de-energized is provided and by way of illustration, I show for this purpose a cylinder 326 having a piston 328 therein connected with the core 322 and a check valve 330 associated with the cylinder.

A return spring is indicated at 332 and a vent at 334, the size of which is predetermined so that the return speed can be regulated as desired. The check valve 330 permits a quick rise of the core 322, however, when the solenoid 324 is energized.

Elements 336 and 338 illustrated in Figure 21 are stops to limit the movement upwardly of the core 322.

The elements 312 to 338 are carried on a bracket 340 extending from the platens 218 and in Figure 12, most of this mechanism is housed by housings 342. The switches RS in Figures 9 and 10 are supported on the brackets 212 provided for the switches S⁵.

The plugs 316 are provided with operating levers 344 which are normally retained against stationary stops 346 of the housings 312 by springs 348. The sleeves 314 are each provided with a contact 350, while the plugs 316 are provided with contacts 352 and 354 electrically connected together so that whenever either the contact 352 or 354 is in contact with the contact 350, a single circuit is established.

The platens 218 and 220 (with the exception of the uppermost platen 218) of the press are each provided with a switch S⁶ shown in Figures 12a, 12b and 12c. Each switch S⁶ comprises an insulating cup 356 having a contact 358 pivoted therein and constrained to a central position by a spring 360. A coacting contact for each contact 358 is provided at 362. These are mounted in insulating studs 364 carried by the various links 226 of the press P. In operation, the press being open as in Figure 12a, when it closes, the studs 364 will travel in the direction of the arrow 366 of Figure 12a and the contact 358 will swing as indicated by the curved arrow 368 in Figure 12b without closing any circuit across the contacts 358 and 362.

When the links swing in the opposite direction as indicated by the arrow 370 in Figure 12c due to opening of the press, the contacts 358 and 362 will be engaged momentarily and the springs 360 will then swing the contact 358 to its full line position of Figure 12a. Thus momentary contact is had when the press opens but no contact is had when it closes.

With reference to Figure 25, the hydraulic means for closing the press is shown diagrammatically. A reservoir is indicated at 372 for oil 374. A pump 376 is provided and driven by an electric motor 378 for pumping oil through a three-way valve 380 to the cylinder 224 of the press when the valve is in the position clockwise of the central or "off" position illustrated in Figure 25. When the valve is in such position, contacts 382 are closed for energizing the motor 378. To prevent excessive pressure being exerted on the press, a pressure relief or by-pass valve 383 may be provided or an automatic pressure switch such as indicated at 384 in Figure 26 may be used, the operation of which is hereinafter described.

The apparatus shown in Figure 25 enables an operator to manually control the operation of the press P, causing the press to close when the handle of the valve 380 is raised and to lower when this handle is lowered from the central position illustrated.

In the lower position, the weight of the press causes the oil from the cylinder 224 to return to the reservoir 372.

If it is found desirable to change the time for closing the press, a rheostat 386 may be adjusted accordingly while the valve 380 may be adjusted to greater or less opening if it is desired to change the opening time of the press. An adjustable stop 382ª is illustrated for this purpose.

Instead of a manual control for the press, an automatic control can be provided in the form of apparatus shown in Figure 26. In this figure, a two-way switch S⁷ is shown which is operated by a mat board on the loading rack as will hereinafter be described under the heading "Practical operation". A switch S⁸ is also shown and it is arranged to be operated by a mat board on the press. The switch 384 is an automatic pressure switch which cuts off the current whenever the pressure reaches a predetermined value and allows it to close again when the pressure of the oil on the hydraulic ram 222 reduces below such predetermined pressure. A valve 380a is substituted for the valve 380 and it is automatically operable to raising and lowering positions by solenoids 388 and 390, a spring 392 normally tending to keep the valve in central position.

The apparatus in Figure 26 includes the reservoir 372, pump 376 and rheostat 386 of Figure 25, the rheostat being operatively connected as shown in Figure 3a with the variable speed control so that as the main chain 38 is speeded up, the motor 378 is also speeded up to synchronize the press closing time with the speed of mat board production.

Practical operation

The mat comes in a continuous sheet from the forming press FP onto the driven rolls 44 of the table T. For the purpose of illustration, we can assume a forming and conveying rate of 8 feet per minute or 12 feet in a minute and a half and a length of mat board 12 feet 2 inches. Therefore, the time required for 12 feet and 2 inches of the mat to pass the rotary cutoff knife 78 is slightly more than a minute and a half, or to be exact, a minute and 31¼ seconds.

After 12 feet and 2 inches of the mat pass the knife, the forward end of the mat strikes the switch S¹, causing the contacts 120 and 122 to be engaged for energizing the solenoid 114. This results in the core of the solenoid being pulled downwardly so that the hook 112 (see Figure 5a) will hook into a link of the main chain 38. The knife 78 rotates continuously and will therefore start cutting the mat as soon as it strikes the edge thereof adjacent the starting point of the knife across the track 84.

The hook 112 will be carried with the chain 38 for pulling the slide 106 along the track 108, thus unwinding the flexible element 104 from the drum 102 and winding the flexible element 96 on the drum 98.

This causes the carriage 82 of the knife to traverse the angularly arranged track 84, causing the knife to move in synchronism with the mat it is cutting.

When the carriage 82 strikes the pin 130 of the switch S³, the circuit to the solenoid 114 is broken so that the hook 112 is raised and the weight 92 starts to return the knife, it being automatically raised in the usual manner so that it does not cut through the mat on the return stroke. As soon as the carriage 82 leaves the pin 130, the contacts of the switch S³ would close if it were not for the delaying means at 134, 136, 138 and 140. This delaying means gives plenty of time for the advancing edge of the mat board cut off to strike the switch S² so as to break the circuit at this point and keep it broken until the cutoff mat board has allowed the switch S¹ to return and the trailing edge of the mat board leaves the switch S², the switch S² thus preventing the solenoid 114 from becoming energized when the contacts of the switch S³ again engage as such engagement is entirely to occur while the first mat board is still holding the switch S¹ depressed.

After the first mat board is cut off the mat, the resulting advance edge of the mat will strike the switch S¹ and another board will be cut off and so on.

As soon as the mat board cut off strikes the switch S², it also strikes the switch S⁴ for energizing the solenoid 150 of Figure 5c and thus shifting the clutch element 56 to speed up the table rolls 46 and the tipping conveyor TC. This occurs at the completion of the cutoff operation and keeps the mat board cut off away from the knife and also will advance it along the tipping conveyor so as not to interfere with the next mat board while it is being cut off.

It is desirable to keep the rolls 46 and the tipping conveyor speeded up after the mat board leaves the switch S⁴ and the switch S⁴' is provided for this purpose as the solenoid 150 will remain energized until the mat board leaves the switch S⁴'. The switch S⁴' is located on the tipping conveyor in the proper position so that the advance edge of the mat board nearly reaches the discharge end of the tipping conveyor before its trailing edge leaves the switch S⁴' so that the rolls 46 and the tipping conveyor are again slowed down to the normal forming rate of 8 feet per minute just before the mat board enters the loading press P.

Assuming the tipping conveyor in the position of Figures 2 and 28, the first mat board will be delivered to the uppermost conveyor of the loading rack R.

When the mat board is completely on this first conveyor, it will operate the switch S⁵ which will energize the solenoid 160 of the tipping conveyor for causing the conveyor to drop one space of the loading rack whereupon the next board will enter the second conveyor of the loading rack, causing the switch S⁵ thereof to be operated for dropping the tipping conveyor another space of the loading rack and so on until all conveyors of the loading rack have been filled.

On the drawings, I have illustrated a loading rack and a press each capable of containing twenty mat boards and accordingly the ratchet wheel 154 has twenty teeth and the cam 164 has nineteen riser portions 168. It is obvious of course that any other number of spaces can be provided in the loading rack as found desirable and the other parts of the apparatus may be designed in accordance therewith.

In the operation thus far described, it has been assumed that the conveyor rolls 180 of the loading rack R are in operation. As each mat board completes its travel into its respective space of the loading rack, the clutch for that space must be de-energized. This is accomplished by the switches RS arranged for each space of the loading rack.

Referring to Figure 20, the normal position of this switch is indicated at D so that the contacts 350 and 354 are in engagement for establishing the circuit through the solenoid 210 of the rack clutch. As the mat board MB leaves the discharge end of the loading rack conveyor, it will strike the arm 344 as at A for separating these contacts, thus breaking the circuit through the solenoid and stopping the conveyor clutch for that particular conveyor. Obviously, as each mat board fills its designated loading rack space, it will likewise disengage the clutch thereof so that all twenty spaces of the rack can be automatically filled and will remain in such condition until the solenoids 210 are again energized for discharging the mat boards from the rack.

While the twenty spaces of the loading rack are being filled, the main press P has been closed for placing the mat boards therein under pressure and steam has been used if desired for heating the platens to dry out the mat boards, or they are merely left under pressure to dry as desired and the press has been opened. This operation will be more fully described later, but for the time being, it can be assumed that since the loading rack has been filled, the press is now open and ready to discharge the mat boards contained therein.

Assuming the opening time for the press to be about 3 minutes, it is obvious that the press has been opening during the time that the nineteenth and twentieth mat boards have entered the loading rack. As the upper press platen 218 moves away from the platen 214 and hangs on the upper links 226, nothing happens. As the second platen 218 moves away from the first platen 218, however, the links connecting these two platens straighten out as indicated by the arrow 370 in Figure 12c and cause momentary contact at the contacts 358 and 362. This, as will be obvious in Figure 23, will establish a circuit through the solenoids 324 of the switches RS and PS for rotating the sleeve 314 from the position of Figure 20 at A to the position at B, thus engaging the contacts 352 and 350 to start the uppermost conveyor of the loading rack and the uppermost conveyor of the press.

In Figure 23, (#1) after RS indicates that this is the control switch RS of the first space of the rack and likewise (#1) following PS indicates the control switch PS of the first conveyor of the press. (#19) and (#20) are similarly representative of switches of the loading rack and press conveyor, spaces #19 and #20. Also, (#2) and (#20) following S⁶ in this diagram indicate that these switches are on press platens 218 for the second and twentieth mat boards.

Since it takes about three minutes for the press to open, it will be obvious that after the first mat board enters the press from the loading rack, the remaining boards #2 to #20 will enter consecutively, #19 and #20 entering at the same time because there is one switch S⁶ for the twentieth press platen which operates the clutches for the nineteenth and twentieth spaces of both the rack and the press. By this arrangement, the boards enter and leave the press consecutively which is shown diagrammatically in Figure 27. In this figure, it will be noted that the mat boards leaving the press are indicated as MB¹, MB² * * * MB²⁰ and the mat boards entering the press are indicated at MB'¹, MB'² * * * MB'²⁰. Since it takes approximately a minute and a half for the twentieth board to enter the loading rack, just before it starts in, the board MB¹ will be completely discharged from the press P and the board MB'¹ will have completely entered the press.

Boards MB² to MB⁹ and MB'² to MB'⁹ will be leaving and entering the press respectively in consecutive order and boards MB¹⁰ and MB'¹⁰ will be ready to leave and enter the press. By such an arrangement, boards MB¹⁰ to MB¹⁸ will start to consecutively leave the press and MB'¹⁰ to MB'¹⁸ will consecutively enter the press, while board MB'¹⁹ remains stationary in the loading rack and board MB'²⁰, for instance, is traveling from half in to all the way in the loading rack.

By this time, the press will be fully opened and the control switch S⁶ of the lowermost platen 218 will have moved the clutches for moving the boards MB¹⁹, MB²⁰, MB'¹⁹ and MB'²⁰ out of and into the press, respectively. By this time, the board MB'¹⁰ is completely in the press and so are all the boards MB'¹ to MB'⁹ completely in the press so that these spaces and particularly the upper space of the rack is ready to receive the next mat board coming from the tipping conveyor after it is raised to the starting position by the roller 174 traversing the drop portion 170 of the cam 164. Thus by the consecutive loading arrangement, it is not necessary to even momentarily stop production ahead of the loading rack as the rack is ready to start filling up again.

It has already been described how the switch RS for each loading rack conveyor automatically stops the conveyor when the mat board is completely in the rack. Likewise, the switch PS of each press platen stops the mat board when it is completely in the press.

By the special type of switch shown in Figure 20, the delaying means for the solenoid 324 prevents the spring 332 from immediately returning the contact 350 from the position of Figure 20 at B to the position at A until the conveyor has been operated sufficiently to advance the mat board from the positions at A and B to a position swinging the lever 344 further toward the right, so as to move the contact 352 clockwise to keep it engaged with the contact 350 even though this contact moves back due to the spring 332 and thus keep the clutch energized until the mat board passes the arm 344 as at D. In the position at D, the arm 344 has swung back to its stop 346, momentarily breaking the circuit but again making it by engaging the contact 354 with the contact 350 so that the conveyor for the switch controls will remain in motion until stopped by the next mat board as at A.

If the press is to be manually operated, as soon as it has been completely filled the operator manipulates the valve 380 for operating the pump 376 and directing the oil to flow beneath the ram 222. This will raise the platen or ram head 220 for pressing all the mat boards between the platens and if stops such as 300 are used, the valve 380 can be maintained in the proper position until all the space is taken up between the stops and the platens. Thereafter the pressure relief valve 383 will permit the motor to operate without building up excessive pressure in the hydraulic press until the operator moves the valve to the inoperative central position.

Subsequently, the operator can notice when the eighteenth board has completely entered the press and rotate the valve 380 counterclockwise for opening the press, the passageway being predetermined so that the opening will take about the same length of time as it will take for the last two boards to enter the loading rack.

In addition to operating the valve 380, it is then only necessary for the operator to manipulate the handle 40 of the variable speed control 36 for changing the production rate in accordance with humidity conditions, the moisture content of the mat, the available steam pressure for heating the platens, the temperature conditions and other factors. If he finds that the boards stay in the press too long and become overdried, he can increase the speed at the variable speed control and also change the setting of the rheostat 386 for faster closing of the press and the stop 382ᵃ for faster opening of the press, while if the boards are leaving the press in too damp a condition he can remedy this by adjusting the controls in the opposite direction.

The apparatus shown in Figure 26 provides for further automatic control of the apparatus without the necessity of manually controlling it as when the apparatus of Figure 25 is used. The switch S⁷ is located at the discharge end of the eighteenth space of the loading rack, while the switch S⁸ is arranged at the discharge end of the platen 220 of the press. Consequently, when the eighteenth board has completely entered the loading rack, the contacts of the switch S⁷ are changed so that current flows through the solenoid 390 for permitting the oil from beneath the ram 220 to return to the reservoir 372, thus opening the press P.

After the press has been completely opened and the mat board MB'²⁰ has completely entered the press, the switch S⁷ will have reverted to its initial position because the board MB'¹⁸ has entered the press and the switch S⁸ will then be closed for energizing the motor 378 and changing the position of the valve 380a to close the press. The press will close until stopped by the contacts of the high pressure cutoff switch 384 opening and will remain closed without the motor 378 being energized even though the contacts of the switch S⁸ are closed, except of course in case the pressure on the ram 222 reduced because of the mat boards being compressed whereupon the oil pressure will be reduced in the switch 384 and operate the motor 378 again, thus automatically maintaining a desired pressure on the ram.

The circuit for the switch S⁸ passes through the switch S⁷ so that there is no danger of the switch 384 operating the solenoid 388 and the motor 378 when the switch S⁷ energizes the solenoid 390 for opening the press. When the switch S⁷ is in press opening position, the circuit is automatically broken through this switch to the switches S⁸ and 384 which, during the opening operation, are both closed, the switch S⁸ all of this time and the switch 384 as soon as the press starts to open.

By connecting the variable speed control as by a link 392 and a lever 394 with the rheostat 386, the press closing time may be varied in accordance with any change in the variable speed control. Likewise, by means of a link 396 and a cam 398 for instance, the position of the valve 380a, when in press lowering position can be changed, thus changing the press opening time in accordance with the variable speed control. These interconnections are shown merely by way of illustration as any equivalent therefor may be devised, the primary object of my arrangement for this purpose being to automatically control all parts of the apparatus from a single station.

The cycle of operations described for the apparatus assumes 27 minutes 22½ seconds as the period of time in which the press is closed and the mat boards therein are dried. If the required drying time is greater than this allows, the various units of the apparatus may be slowed down the proper amount. For example, if the closing and drying time is 35 minutes, the speed of the mat issuing from the forming machine and the speed of the mat boards into the loading rack and press should be slowed down to about 6.6 feet per minute, while if the closing and drying time is 25 minutes, the speed should be increased to about 9.25 feet per minute.

In actual practice, it may be desirable to set the speed of the apparatus at a slightly slower rate than that corresponding to the normal drying rate and operate the press so that it remains open for a short interval of time before the loading rack is filled to the proper point for starting the loading and unloading of the press. This will allow small variations in drying time to be accommodated without a change in mat formation rate. The foregoing arrangement is especially adaptable when the manual control of Figure 25 is used in connection with the press.

When the variation in drying rate becomes too great to be accommodated in this manner, it may be compensated for by changing the variable speed control 36 as previously outlined and illustrated.

The loading rack and press conveyors are preferably timed so that their speed is slightly greater than the mat formation rate which will load the mat boards onto the loading rack sufficiently ahead of the uncut mat from the forming machine so that the tipping conveyor will have sufficient time to shift to another space in the loading rack before the following mat board reaches the discharge end of the tipping conveyor.

The cycle of operations outlined refers to the procedure to be used with all types of press conveyors illustrated on my drawings with the exception of the one shown in Figures 18 and 19.

When using this type of conveyor, it will be necessary to retard the movement of the mat boards from the loading rack onto the press platens until the finished mat board on the platen has been discharged and the screen portion 292 of the conveyor returned to the upper side of the platen 290. This is accomplished by providing a projection 400 on the chain 286 and a normally open switch S⁹ for each press conveyor. The switch S⁹, as shown in Figure 24, controls the solenoid 324 so that the loading rack clutch operated by the solenoid 210 is not engaged until the projection 400 normally at the discharge end of the platen has reached the intake end thereof, the mat board on the platen having been discharged by this time.

The loading rack clutch is then engaged for causing the mat board to leave the loading rack conveyor and enter the press and both the clutch of the press and the clutch of the loading rack are stopped when the board is completely in the press by the control switch PS previously described. Because of the interval of time during which the mat board remains in the loading rack while the board in the press is being discharged, it will be necessary to substantially double the speed of the loading rack and press conveyors in order to carry out this modified method of operation, which of course is easily accomplished by using the proper sizes of sprockets for transmitting motion from the main chain 38 to the conveyors.

It is conceivable that my apparatus can be modified so that all of the boards in the loading rack and all of those in the press can be discharged simultaneously instead of consecutively as outlined. Such an arrangement, however, calls for such a close differential in the timing between the various conveyors that there is apt to be interference between successive mat boards, especially when a mat board leaves the tipping conveyor to enter the loading rack. I therefore deem it advisable to use the consecutive loading arrangement even though it complicates the mechanism somewhat by multiplying the number of clutches and controlling devices therefor, preferring the additional initial cost thereof with the leeway gained when compared with less initial cost and the possibility of the apparatus not operating smoothly when using a simultaneous system of loading at rack and press.

Another advantage gained is in the discharge of the finished boards from the press. Since they will discharge consecutively, time is given an operator to dispense with the boards, which of course he must do consecutively, while if automatic conveyor mechanism is provided, obviously it could handle the boards consecutively much easier than when all twenty of them come from the press at the same time.

In the electric diagram of Figure 23, the switch S⁶ for the second mat board in the press operates the rack and press switches RS and PS for the first boards in the rack and press, while the switch S⁶ for the twentieth board in the press operates the switches RS and PS for both the nineteenth and twentieth boards in the rack and press. This is necessary in order that the lower stretch of the conveyor chain for the first board in the press of Figure 12 is freed by opening the part of the press holding the second board. This arrangement is also necessary for the split platen of Figure 16.

Where the conveyor arrangements of Figures 17 and 19, are used, this arrangement is unnecessary because when the press opens for the first board, the conveyor for it is free and therefore a switch S⁶ for the first board in the press can operate the switches RS and PS for the first board in the rack and press and so on until a switch S⁶ for the twentieth board in the press can operate the switches RS and PS for the twentieth boards in the rack and press to cause their clutches to operate immediately after this part of the press opens.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a mat board handling machine, a loading rack having a plurality of spaced conveyors, a press having a plurality of spaced, consecutively opening platens and a conveyor for each platen, means for loading a mat board on each conveyor of said loading rack, means operable by each platen of the press when opening to actuate a loading rack conveyor and a press conveyor whereby the conveyors of the loading rack and of the press are unloaded consecutively and means associated with each conveyor to stop the same when a mat board has been loaded thereon.

2. In a mat board handling machine, a loading rack having a plurality of spaced conveyors, a press having a plurality of spaced and consecutively opening platens, means for loading mat boards or the like on said conveyors of said loading rack, means for unloading the mat boards from said press and means operable by each platen of the press when opening to actuate a corresponding one of said loading rack conveyors whereby mat boards in the loading rack are unloaded into the press consecutively and means for stopping the conveyors as each is unloaded.

3. In a mat board handling machine, a loading rack having a plurality of spaced conveyors, a press having a plurality of spaced, consecutively opening platens and a conveyor for each platen, means for loading a mat board on each of said conveyors of said loading rack, means operable by each platen of the press except the first one when opening to actuate one of said loading rack conveyors and one of said press conveyors whereby the conveyors of the loading rack and of the press are unloaded consecutively, said means being operable after the first platen opens and the last platen to open operating the two last rack conveyors and the two last press conveyors and means associated with each conveyor to stop the same when a mat board has been loaded thereon.

4. In a mat board handling machine, a loading rack having a series of conveyors, a press having a series of platens and a conveyor for each platen, means for loading mat boards or the like on said conveyors of said loading rack, means operable by the press when open to actuate said loading rack conveyors and said press conveyors whereby mat boards of the loading rack and press are unloaded, the mat boards of the loading rack being loaded into the press and means for stopping the conveyors when they become loaded with mat boards.

5. In a mat board handling machine, a loading rack having a plurality of spaced conveyors, a press having a plurality of spaced, successively opening platens and a conveyor for each platen, the conveyors of said loading rack and said press being in registry with each other when the press is open, means for loading mat boards on said conveyors of said loading rack, said last means including a mat cut-off knife, a table, a tipping conveyor swingable to register with the various conveyors of said loading rack and means for temporarily speeding up said tipping conveyor after a board has been cut from a mat which is fed to said table.

6. In a mat board handling machine, a loading rack having a plurality of spaced conveyors, means for loading mat boards on said conveyors of said loading rack, said last means including a mat cut-off knife, a table, a tipping conveyor swingable to register with the various conveyors of said loading rack and means for temporarily speeding up said tipping conveyor after a board has been cut from a mat which is fed to said table.

7. In a machine for handling mat boards and the like, a loading rack having a series of conveyors, a press having an opening for each conveyor and a press conveyor for each opening of the press, said openings being adapted to receive mat boards from said loading rack and to close for drying said mat boards and consecutively open for discharging them and means for each conveyor of said loading rack operable to start the conveyor thereof and also the corresponding conveyor of the press to unload the loading rack into the press and to unload the press and means associated with each conveyor of the loading rack and of the press to stop the conveyor upon its becoming loaded with a mat board.

8. In a machine for handling mat boards and the like, a loading rack having a plurality of conveyors, a press having an opening for each conveyor and a press conveyor for each opening thereof, the openings of said press being adapted to receive mat boards from said loading rack and to close for drying said mat boards and open for discharging them and means for the conveyors of said loading rack operable to start them and also their corresponding conveyors of the press to unload the loading rack into the press and to unload the press and means associated with each conveyor of the loading rack and of the press to stop the conveyor upon its becoming loaded.

9. In a machine of the class described, a mat board press having a plurality of consecutively opening platens, means for opening and closing said platens, a loading rack having loading conveyors, one for each space between the platens of said press, means for loading said conveyors and means operable by opening of the platens of said press to discharge mat boards therefrom and to operate each one of said conveyors to load its mat board into said press as the platen registering therewith opens.

10. In a machine of the class described, a mat board press having a plurality of platens, means for opening and closing said platens, a loading rack having loading conveyors, one for each space between the platens of said press, means for loading said conveyors and means operable by opening of said press to discharge mat boards therefrom and operate said conveyors to load said press.

11. In a machine of the class described, a mat board press having a plurality of consecutively opening platens, means for opening and closing said platens, a loading rack having loading conveyors, one for each space between the platens of said press, means for loading said conveyors and means operable by the opening of each space between the platens of the press to discharge a mat board from the press and start the loading conveyor therebehind to load another board into the press, said means, due to the consecutive opening of the press platens, also operating consecutively.

12. A unitary apparatus for completing the cut-off and pressing operations on mat material and the like comprising a table, a tipping conveyor, a loading rack, and a press consecutively arranged, a knife for cutting mat material traveling along said table into mat boards of predetermined length, means for temporarily speeding up said tipping conveyor after a mat board is received thereon subsequent to being cut from the mat material, said loading rack having a plurality of conveyors each for a mat board received from said tipping conveyor, means for intermittently changing the tipping angle of said tipping conveyor for causing the successive mat boards discharged therefrom to be received on the consecutive conveyors of the loading rack, means synchronized with the opening of said press to cause said conveyors of said loading rack to consecutively place their mat boards into said press after a pressing operation on previous mat boards has been performed and means for closing said press when filled and opening it when a predetermined portion of the loading rack has been filled.

13. A unitary apparatus for completing the cut-off and pressing operations on mat material and the like comprising a table, a conveyor, a loading rack and a press consecutively arranged, a knife for cutting mat material traveling along said table into mat boards of predetermined length, means for temporarily speeding up said conveyor after a mat board is received thereon subsequent to being cut from the mat material, said loading rack having a plurality of conveyors to receive successive mat boards from said first mentioned conveyor, means synchronized with the opening of said press to cause said conveyors of said loading rack to consecutively transfer their mat boards into said press and means for closing said press when filled with mat boards 14. A unitary apparatus for completing the cut-off and pressing operations on mat material and the like comprising a table, a transfer conveyor, a loading rack and an openable and closeable press consecutively arranged, a knife for cutting mat material traveling continuously along said table into mat boards of predetermined length, means for temporarily speeding up said transfer conveyor after a mat board is received thereon subsequent to being cut from the mat material, said loading rack having a series of conveyors each for a mat board received from said transfer conveyor, means for intermittently shifting said transfer conveyor for causing the successive mat boards discharged therefrom to be received on the different conveyors of the loading rack, means synchronized with the opening of said press to cause said conveyors of said loading rack to consecutively discharge their mat boards into said press, means for closing said press when filled and opening it when a predetermined percentage of the loading rack has been filled, and synchronized means for operating said table, transfer conveyor, loading rack and press, said last means being variable for changing the speed of the apparatus in accordance with the time required for the mat boards to remain in the press.

15. A unitary apparatus for completing the cut-off and pressing operations on mat material and the like comprising a table, a transfer conveyor, a loading rack and a press consecutively arranged, said press having consecutively opening platens, a knife for cutting mat material traveling continuously along said table into mat boards of predetermined length, means for temporarily speeding up said transfer conveyor after a mat board is received thereon subsequent to being cut from the mat material, said loading rack having a plurality of conveyors each for a mat board received from said transfer conveyor and one for each platen of said press, means for intermittently shifting said transfer conveyor for causing the consecutive mat boards discharged therefrom to be received on the consecutive conveyors of the loading rack, means synchronized with the opening of said press and controlled by said platens as they open to cause said conveyors of said loading rack to consecutively discharge their mat boards into said press, means for closing said press when filled and opening it when a predetermined percentage of the loading rack has been filled, and synchronized means for operating said table, transfer conveyor, loading rack and press.

16. In a press for mat boards and the like, a series of platens, perforate conveyors traversing said platens, the mat boards assuming positions intermediate the conveyors and one surface of each platen, each platen being split, the return stretches of said conveyors extending between the two portions of said split platens and perforations through said platens for conducting steam from the mat and conveyor engaging surfaces thereof into the spaces between the two portions of each split platen.

17. In a press for mat boards and the like, a series of platens, perforate conveyors traversing said platens, the mat boards assuming positions intermediate the conveyors and one surface of each platen, each platen being split, the return stretches of said conveyors extending between the two portions of said split platens and perforations through at least one portion of each split platen for conducting steam from the mat or conveyor engaging surface thereof to the space between said portion and the other portion thereof.

18. In a press for mat boards and the like, a conveyor for said platen, said platen being split and perforations through at least one of the halves thereof for conducting steam from the mat engaging surfaces thereof into the spaces between the two halves of the platen, said conveyor having one stretch traversing the mat engaging surface of said platen and its other stretch extending between the two halves of the platen.

19. In a press for mat boards and the like, a platen, a conveyor for said platen, said platen being split, said conveyor having one stretch traversing the mat engaging surface of said platen and its other stretch extending between the two halves thereof, said two halves being connected to each other with a lost motion connection which permits the lower half to be spaced further from the upper half than the thickness of said conveyor when the press is open and the lower half suspended from the upper half and the two halves to engage the stretch of the conveyor between them when the press is closed.

20. In a press for mat boards and the like, a platen, a conveyor traversing said platen and adapted to convey a mat board in one direction to a position on said platen or in the same direction to a position off the platen, said conveyor comprising a pair of side chains, a pair of sprockets for each side chain and rotated at the ends of the platens and a half length conveyor belt extending substantially half way around said chains whereby the conveyor belt covers one side of the platen only when in position for pressing the mat boards and covers the other side thereof when in an intermediate position.

21. In a press for mat boards and the like, a pair of platens, a perforate conveyor traversing one face of one of said platens, perforations through said platens for conducting steam away from the mat and conveyor engaging surfaces thereof the return stretch of said conveyor being interposed between said pair of platens.

22. Apparatus of the character described comprising a plural conveyor press having successively opening platens and a plural conveyor loading rack therefor and automatic means for starting the conveyors of said press and rack when the press opens and for stopping said conveyors when they become filled with mat boards, said platens as each of them opens individually controlling the operation of the conveyors whereby they are consecutively started and stopped.

23. Apparatus of the character described comprising a plural conveyor press having successively opening platens, power means for opening and closing said press, a plural conveyor loading rack for said press, means continuously operable to fill the conveyors of said loading rack with mat boards, automatic means for starting the conveyors of said press and rack when the press opens and for stopping said conveyors when they become filled with mat boards, said platens as each of them opens individually controlling the operation of the conveyors whereby they are consecutively started and stopped and means for controlling said power means to open the press when said loading rack is nearly completely filled and to close the press when it is completely filled.

24. Apparatus of the character described comprising a plural conveyor press having successively opening platens, power means for opening and closing said press, a plural conveyor loading rack for said press, means continuously operable to fill the conveyors of said loading rack with mat boards, automatic means for starting the conveyors of said press and rack when the press opens and for stopping said conveyors when they become filled with mat boards, said platens as each of them opens individually controlling the operation of the conveyors whereby they are consecutively started and stopped and means for controlling said power means to open the press when said loading rack is nearly completely filled and to close the press when it is completely filled, said continuously operable means and said power means being synchronized and variable in accordance with the time required for the mat boards to remain in the press.

25. In a mat board handling machine, a loading rack, a press having a plurality of spaced and consecutively opening platens and a conveyor for each platen, means for loading mat boards or the like into said loading rack and for unloading them from the loading rack into said press, means operable by each platen of the press when opening to actuate a corresponding one of said press conveyors whereby mat boards in the press are unloaded consecutively and means for stopping the conveyors as each is unloaded.

26. In a mat board handling machine, a loading rack having a plurality of spaced conveyors, means for loading mat boards on said conveyors of said loading rack, said last means including a mat cut-off knife, a table, a tipping conveyor swingable to register with the various conveyors of said loading rack, means for temporarily speeding up said tipping conveyor after a board has been cut from a mat which is fed to said table, and a single press fixed relative to said loading rack for receiving the mat boards therefrom, said press receiving the mat boards consecutively to prevent interruption of the filling of the loading rack.

27. In a press for mat boards and the like, a plurality of platens, a mesh conveyor for each platen having a stretch extending across one face of the platen and a return stretch, each platen being split, and said return stretches extending through the platens between the two halves thereof, and means for permitting escape of steam from a mat board between said first-mentioned stretch of said conveyor and the other face of the next platen, comprising openings extending from said first face and through half the platen to the space between the two halves of the platen.

28. In a press for mat boards and the like, a plurality of platens, a mesh conveyor for each platen having a stretch extending across one face of the platen and a return stretch, each platen being split, and said return stretches extending through the platens between the two halves thereof, and means for permitting escape of steam from a mat board between said first-mentioned stretch of said conveyor and the other face of the next platen, comprising openings extending from said first face and through half the platen to the space between the two halves of the platen, and other openings extending from the other faces of the platens to said spaces between the two halves of the platens.

29. In a press for mat boards and the like, a platen, a conveyor traversing said platen and adapted to convey a mat board in one direction to a position on said platen or in the same direction to a position off the platen, said conveyor comprising sprockets at opposite ends of the platen, a conveyor extending therearound having a portion throughout one-half its length traversing the face of the platen and a portion throughout the other half thereof offset from said face of said platen, said conveyor traveling in one direction across the face of the platen and in an opposite direction across the opposite surface of the platen.

30. In a device of the class described for handling mat boards, a plural compartment loading rack, a press having a platen for each compartment of the loading rack, said press being fixed relative to said loading rack, means for consecutively unloading the platens of the press and consecutively unloading the compartments of the loading rack into the press, and means for closing the press by unloading of the last mat board from the loading rack into the press.

ORLAND RUSSELL SWEENEY.